United States Patent [19]

Keller

[11] 4,410,676

[45] Oct. 18, 1983

[54] PHENOLIC-CURED PHTHALONITRILE RESINS

[75] Inventor: Teddy M. Keller, Alexandria, Va.

[73] Assignee: The United States of America as represented by the Secretary of the Navy, Washington, D.C.

[21] Appl. No.: 295,915

[22] Filed: Aug. 24, 1981

[51] Int. Cl.$^3$ .............................................. C08G 73/00
[52] U.S. Cl. ................... 528/9; 260/465 F; 260/465 H; 528/125; 528/126; 528/128; 528/166; 528/172; 528/176; 528/206; 528/210; 528/271
[58] Field of Search .................. 528/9, 166, 172, 206, 528/210, 176, 271, 125, 126, 128; 260/465 F, 465 H

[56] References Cited

U.S. PATENT DOCUMENTS

| 4,223,123 | 9/1980 | Keller et al. | 528/210 |
| 4,234,712 | 11/1980 | Keller et al. | 528/9 |
| 4,238,601 | 12/1980 | Keller et al. | 528/206 |
| 4,259,471 | 3/1981 | Keller et al. | 528/9 |
| 4,304,896 | 12/1981 | Keller et al. | 528/9 |

*Primary Examiner*—Lester L. Lee
*Attorney, Agent, or Firm*—Robert F. Beers; William T. Ellis; Thomas E. McDonnell

[57] ABSTRACT

Phthalonitrile resins are obtained from polymerizing a phthalonitrile monomer with a phenolic compound.

23 Claims, 1 Drawing Figure

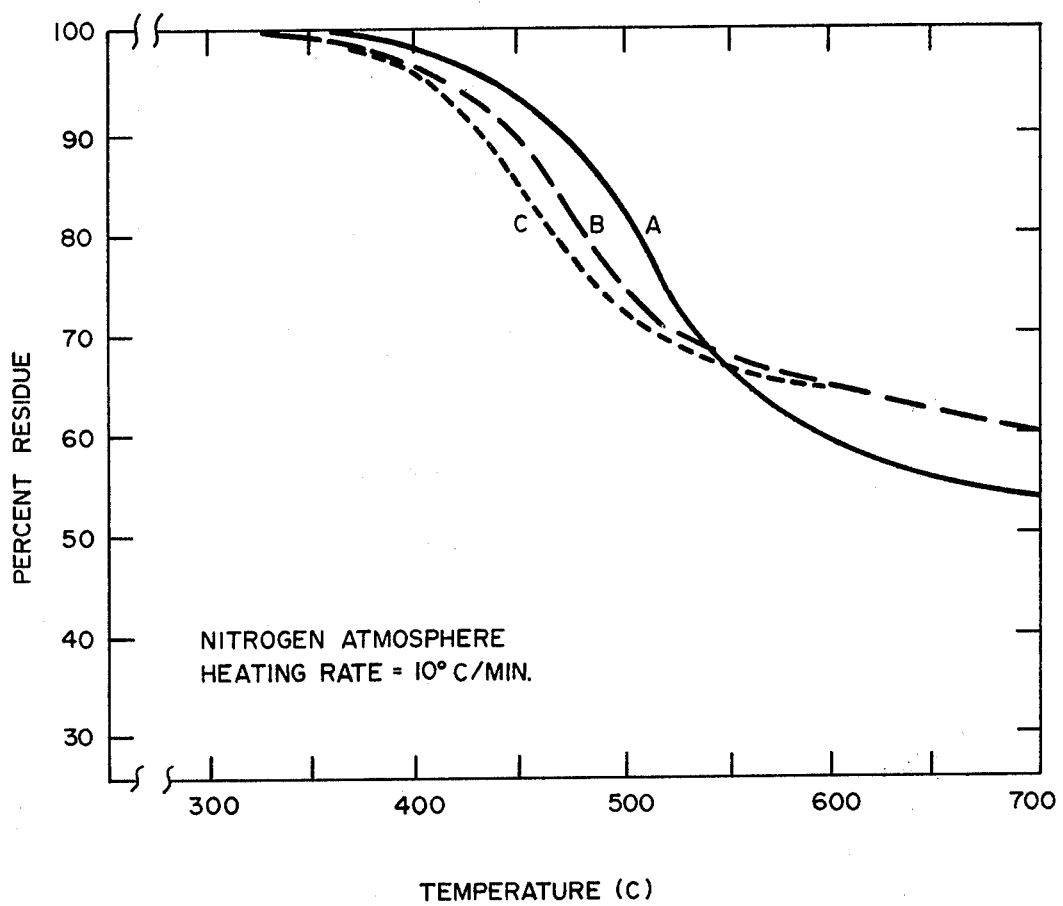

PHENOLIC-CURED PHTHALONITRILE RESINS

BACKGROUND OF THE INVENTION

The present invention pertains generally to organic synthesis and in particular to a rapid synthesis of a diether-linked phthalonitrile resins.

A major advantage of phthalonitrile resins compared to other plastics is their ability to withstand temperature in excess of 200° C. for extended periods without permanent damage to the coating, plastics or composite made therefrom. Presently, epoxies and polyimides are being used but each has disadvantages. Conventional epoxy-based composites and adhesives are limited to 120° C. maximum service. Other problems associated with these polymers include their brittleness, water absorptivity and engineering reliability.

Certain phthalonitrile resins are proving to be superior in physical and chemical properties to epoxies, polyimides and other plastics as matrices for fiber-reinforced composites. It is necessary for a resin not to produce gaseous products when cured. Also the chemical make-up of the polymer must be such that it consists of units having known resistance to bond-rupture under thermal, oxidative, and hydrolytic conditions.

Such resins usually contain a substantial proportion of aromatic structures but cured polymers composed solely of aromatic rings tend to be brittle and intractable. If a resin has flexible linkages between the aromatic rings, these disadvantages would be minimized or eliminated. Polyphthalocyanines with diether linkages are materials which meet these goals. Examples of these polyphthalocyanines are found in U.S. Pat. Nos. 4,223,123; 4,226,801; 4,234,712; 4,238,601 by T. M. Keller and J. R. Griffith. However, these monomer are extremely slow to polymerize and cure, generally taking several days and requiring extremely high temperatures.

SUMMARY OF THE INVENTION

It is, therefore, an object of the present invention to cure diether-linked phthalonitrile monomers in at least about one fourth of the time.

Another object of this invention is to cure diether-linked phthalonitrile monomers quickly at a much lower temperature.

And another object of the present invention is to greatly improve the processability of diether-linked phthalonitrile monomers.

A further object of this invention is to produce a phthalonitrile resin with few or no voids.

A further object of this invention is to improve the properties of phthalonitrile resins by the introduction of a large variety of organic groups into phthalonitrile resins.

These and other objects are achieved by polymerizing a phthalonitrile monomer with a phenol capable of reacting with a nitrile group of the phthalonitrile.

BRIEF DESCRIPTION OF THE DRAWING

A more complete appreciation of the invention and many of the attendant advantages thereof will be readily understood by reference to the following detailed description and the accompanying drawing wherein:

The FIGURE graphically compares the thermogravimetric analysis of three bisphenol-A-phthalonitrile resins.

DETAILED DESCRIPTION OF THE INVENTION

Although any phthalonitrile capable of forming polymeric materials can be polymerized with the phenols of this invention, the advantages of this invention are best realized if the phthalonitrile monomer has no active hydrogen atoms. These monomers, unlike, e.g., those disclosed and claimed in U.S. Pat. No. 4,056,560 issued to Griffith et al., require several days of continuous heating at 260° to 290° C. before a viscosity increase becomes evident, i.e., before reaching the B-stage of polymerization. Examples of these monomers are those in U.S. Pat. Nos. 3,730,946; 3,763,210; 3,787,475; 3,869,499; 3,972,902, issued to D. R. Heath and J. G. Wirth. These monomers are all di-ether linked, but monomers with other bridges without active hydrogen atoms can be quickly polymerized by the addition of the phenols of this invention.

However, the importance of this invention is the rapid polymerization of di-ether linked di-phthalonitrile monomers because the ether linkages impart sufficient flexibility to the resin to make the resin an excellent composites resin. Accordingly, the preferred phthalonitrile monomers are represented by the formula:

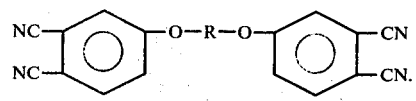

The most preferred di-phthalonitrile monomers are those wherein R is selected from the class consisting of
—φ—C$_3$H$_6$—φ—, —φ—SO$_2$—φ—

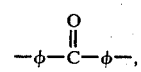

—φ—, —C$_n$H$_{2n}$ and —φ—φ— wherein the phenyl groups are linked at the para and the meta positions.

It is possible with the present invention to include a metal or metal salt. For composite fabrication, a salt or a metal would be less desirable because of problems with homogeneity and gasing. Examples of suitable metal salts include cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride (2TPPO/SnCl$_2$) and mixtures thereof. The metals which can be used include chromium, molybdenum, vanadium, beryllium, silver, mercury, aluminum, tin, lead, antimony, calcium, barium, manganese, magnesium, zinc, copper, iron, cobalt, nickel, palladium, and platinum. Mixtures of these metals may also be used. The preferred metals are copper, silver, and iron.

The phenols greatly increase the polymerization of phthalonitrile monomers which contain no active hydrogens. An accelerated cure is theorized to occur due to the phenol initially attacking a nitrile group of the phthalonitrile monomer to produce an N-substituted-3-phenoxyisoindolenine unit, which reacts with other nitrile groups to propagate the polymer. The hypothesized mechanism is represented as follows:

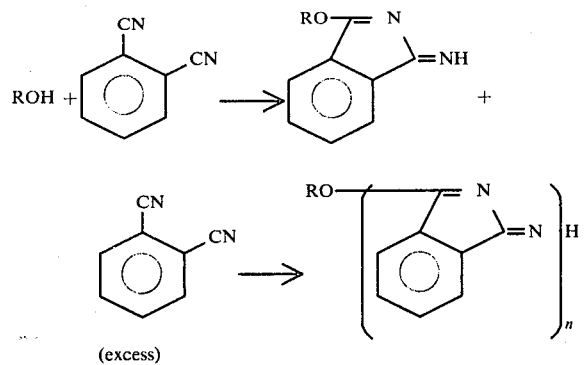

(excess)

wherein R represents an aromatic ring. It is understood that the above hypothesis is presented as a possible explanation of the surprising improvement in the polymerization time and temperature by the inclusion of a phenol with a phthalonitrile monomer.

Aliphatic alcohols have been tried, but have little effect on the polymerization. A possible explanation for the small effect is that the OH is less reactive compared to those on aromatic rings. The presence of an electron-withdrawing group on an aliphatic alcohol could produce a very effective alcohol curing reagent.

For applications which can tolerate voids in the cured resin, a greater number of phenols can be selected because the boiling point and decomposition temperature of the phenol can be lower than those of a phenol to be used in a void-free application. The decomposition temperature for this invention is defined as the temperature at which the molecular structure changes to give volatiles. If voids can be tolerated almost any phenol can be used if enough of the phenol is included to compensate for the loss of the phenol or a means is provided to recirculate the vaporized phenol back through the polymerizing monomer or the polymerization is carried out under pressure. The only phenols which can not be used are those which completely decompose at a temperature much below polymerizing temperatures.

If voids can not be tolerated in the cured resin, e.g., resins for graphite composites, then the boiling point and decomposition temperature of the phenol must be at least about 50° C. higher than the processing temperature and preferably at least 75° C. higher than the processing temperature. Examples of phenols meeting these minimum temperature requirements are bisphenol-S, bisphenol-A, 4,4'-dihydroxydiphenyl, bisphenol-A-polysulfone which is represented by the formula

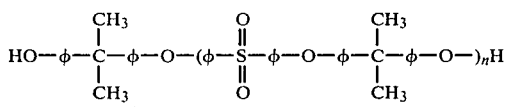

the hydroxyl substituted fused-ring compounds, such as naphthalene, anthracene, and phenanthrene, and the hydroxyl-substituted multiple-ring compounds such as diphenyl. The fused-ring phenols should have at least 2 carbon atoms between the hydroxyl groups if more than one hydroxyl group is present.

Since the hydroxy groups enter the reaction, polyhydric phenols are preferred. Similarly, it is preferred that the number of repetitions (n) of the repeating unit in the polysulfone phenol is from 1 to 5 and most preferably from 1 to 3. The overall preferred phenols are bisphenol A, bisphenol S, and bisphenol-A-polysulfone with 1 to 5 repeating units.

The polymerization of the phthalonitrile can be carried out by two methods: heat polymerization and solvent polymerization. Since the importance of this invention is the rapid polymerization of certain phthalonitrile monomers useful in fabricating composites, heat polymerization is preferred because of the potential void problems from entrapped solvent molecules in the solvent processing method. The advantage of solvent processing is the much lower processing temperature, thus permitting many more phenols to be used.

Heat polymerization comprises admixing a diphthalonitrile with a phenol at a temperature from at least about the melting point of the monomer to about the decomposition temperature of the resulting resin and heating until the monomer has been completely polymerized. The preferred polymerization temperature is from 10° C. above the melting point of the monomer to 30° C. below the decomposition temperature of the resulting resin.

It is possible to terminate the polymerization at the B-stage which is determined by an increase in viscosity. Upon cooling the B-stage prepolymer is a frangible solid which can be broken into a powder. The powder can be stored for a long period of time if kept at a temperature below 100° C. and away from u.v. exposure. To use the B-staged resin, the powder is placed in a mold or admixed with, e.g., graphite fibers and is heated to the above cure temperature range. The cure proceeds as previously.

The amount of phenol which is to be added depends on the reactivity of the phenol and the amount of voids which can be tolerated. For void-free usages the amount of phenol is from about 1 to about 20 percent of the total resin weight and preferably from 3 to 15 weight percent. These amounts are based on a polymerization temperature within the lower half of the polymerization temperature range.

If voids in the cured resin is not objectionable than an amount of phenol up to about 40 weight percent can be added. Unreacted phenol would be detrimental to the overall physical properties of the phthalonitrile resin. The precise upper limit would be the stoichiometric amount. If the phenol is less than about one percent, the improvement would be minimal and of little value.

Solvent polymerization comprises dissolving a phthalonitrile monomer in a solvent, to form a solution, adding a phenol to form a suspension, heating the suspension until the B-stage is reached, quenching the B-staged prepolymer to room temperature, removing the solvent by reduced pressure, polymerizing the B-stage to the C-stage by heating the prepolymer to the polymerization-temperature range, and curing the prepolymer at the above curing-temperature range. Examples of suitable solvents are acetonitrile, methylene chloride, chloroform, toluene, and mono- and dichlorobenzene. The preferred solvents are acetonitrile and toluene. Moreover, the decomposition and/or vaporation problems, which limited the choice of phenolic curing reagent in the heat polymerization method, can be eliminated by the proper solvent selection. Further, the lower temperatures of the system would permit a larger amount of phenol to be used without causing the monomer to polymerize too quickly or create a void problem. Thus, the wide range of about 1 to 40 weight percent of a phenol would apply to solvent polymerization.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

Bisphenol A phthalonitrile monomer (1.5 g, 3.1 mmol) and Bisphenol A (0.50 g, 2.2 mmol) were melted, and mixed thoroughly by stirring on a hot plate at 240° C. in an aluminum planchet. Volatiles attributed to bisphenol A were observed evaporating from the sample. The volatility problem was eliminated by lowering the temperature to 210° C. The sample was then placed in an oven at 200° C. and heated for 24 hours. The geled material was then postcured at 220° C. for 3 hours, and at 260° C. for 3 hours. The cured polymer was green, was void-free and appeared tough.

EXAMPLE 2

Bisphenol A phthalonitrile monomer (1.0 g, 2.0 mmol) and bisphenol A (0.40 g, 2.0 mmol) were melted and mixed by stirring on a hot plate at 220° C. The sample was then placed in an oven preheated to 235° C. and heated for 19 hours. The sample had gelled or solidified after 1 hour. To ensure complete polymerization and to toughen the polymer, the polymer was postcured at 280° C. for 3 hours.

EXAMPLE 3

Bisphenol A phthalonitrile monomer (1.0 g, 2.0 mmol) and bisphenol A (0.11 g, 0.50 mmol) were melted and mixed by stirring in an aluminum planchet at 220° C. The sample was then heated at 235° C. for 22 hours. After 3 hours at 235° C., the sample had solidified. The cured sample was dark green, contained no voids, and appeared fairly tough. It has given a postcure at 280° C. for 3 hours.

EXAMPLE 4

Bisphenol A phthalonitrile monomer (1.3 g, 2.7 mmol) and bisphenol A (0.07 g, 0.31 mmol) were melted and mixed thoroughly in an aluminum planchet at 210° C. The melt was then placed in an oven and heated at 200° C. for 24 hours to achieve gelation. The material was still slightly soft after 20 hours at 200° C. The polymer was then postcured at 250° C. for 22 hours. The polymeric material appeared tough and was void-free.

EXAMPLE 5

Bisphenol S phthalonitrile monomer (1.5 g, 3.0 mmol) and bisphenol S (0.70 g, 2.8 mmol) were thoroughly mixed in the melt in an aluminum planchet. The sample was heated at 260° C. for 23 hours. Solidification had occurred after 1 hour. The polymer contained voids.

A second sample containing the same amount of reactants as above was melted, mixed, and heated at 230° C. for 18 hours. Solidification had occurred after 2 hours. The dark green void-free polymer was postcured at 280° C. for 3 hours.

EXAMPLE 6

Bisphenol A phthalonitrile monomer (1.4 g, 2.9 mmol) and bisphenol A (0.007 g, 0.031 mmol) were melted and mixed in an aluminum planchet at 220° C. The sample was then placed in an oven and heated at 200° C. overnight (20 hours). The appearance of sample was granular with only a slight green coloration. The sample was remelted and heated at 250° C. for 22 hours. After only 3 hours at 280° C., the material had solidified.

EXAMPLE 7

Bisphenol A phthalonitrile monomer (2.0 g, 4.2 mmol) and bisphenol S (0.30 g, 1.2 mmol) were melted, mixed, and heated at 230° C. for 26 hours. After 3 hours, the material was in the rubbery stage; whereas, complete gelation had occurred after 5 hours at 230° C. The sample was postcured at 260° C. for 20 hours.

EXAMPLE 8

Bisphenol A phthalonitrile monomer (2.0 g, 4.2 mmol) and bisphenol S (0.10 g, 0.40 mmol) were melted, mixed, and heated at 230° C. for 26 hours. The melt was quite viscous. The material solidified while being heated at 255° C. for 24 hours.

EXAMPLE 9

A sample of bisphenol A phthalonitrile monomer (1.9 g, 4.0 mmol) and 4,4'-dihydroxybiphenyl (0.18 g, 0.97 mmol) was heated at 250° C. for 22 hours. The sample had not completely geled. The temperature was increased to 280° C. Gelation was achieved after 4 hours. The polymer was postcured for 18 hours at 280° C.

EXAMPLE 10

A sample of bisphenol A monomer (1.0 g, 2.1 mmol) and oligomeric dihydroxyl terminated bisphenol A polysulfone (0.45 g, 0.31 mmol), which had an average molecular weight of 1434 and had been degassed, was mixed by dissolution of the oligomeric mixture into the melt of the monomer at 250° C. in an aluminum planchet. The sample was then placed in an oven and heated at 250° C. for 21 hours. Gelation had occurred after 2 hours. The sample was then postcured at 280° C. for 22 hours. Examination of the cured polymer revealed a tougher polymeric material relative to the nonoligomeric curing reagents.

Thermogravimetric analysis (TGA) was used for the development of the cure cycle. TGA results, measured in nitrogen at a heating rate of 10° C. per minute, on samples of bisphenol-A phthalonitrile cured with the polymeric polysulfone phenols at 250° for 22–48 hours, followed by approximately 1 day post curing at 280°, are shown in the FIGURE. Bisphenol-A-phthalonitrile is represented by the formula $(CN)_2\phi O\phi C_3H_6\phi O\phi(CN)_2$ and is designated as in the tables as Bis-A-Phth. In the FIGURE the A curve represents the neat polymerization, the B curve represents a bis-A-Phth resin with 15 weight percent of the bisphenol A polysulfone additive cured at 250° C. for 21 hours, followed by heating at 280° C. for 22 hours, and the C curve represents a bis-A-phth resin with 20 weight percent of the bisphenol A polysulfone additive cured at 250° C. for 48 hours followed by heating at 280° C. for 24 hours. Compared to neat bisphenol-A phthalonitrile cured for 7 days at 280°, the two bisphenol A polysulfone additive samples volatilized at a greater rate at lower temperatures. However, the rate decreased as the temperature increased; and at 700°, there was about 12 percent more residue. Thermally, these materials seemed adequate. Examination of the cured materials gave the impression of increased toughness.

Specimens for fracture toughness ($G_{Ic}$) and bending modulus measurements were cut from $4''\times 4''\times \frac{1}{4}''$ samples cured according to the cure schedules given in Table 1. Fracture toughness was measured using rectangular compact tensile test specimens. Bending modulus measurements were made on a four point bending apparatus. The result for a "modified" bisphenol A phthalonitrile sample are given in Table 2, along with data for neat bisphenol A phthalonitrile and Narmco 5280 epoxy resin. The results indicate that the additive caused no significant change in the mechanical properties of the cured bisphenol-A phthalonitrile.

TABLE 1
TGA DATA FOR BISPHENOL A PHTHALONITRILE

| Additive | Cure | 1% Wt Loss | 5% Wt Loss | 10% Wt Loss | 20% Wt Loss | 30% Wt Loss | Total % Wt Loss to 700° C. |
|---|---|---|---|---|---|---|---|
| None | 7 days, 280° | 350 | 410 | 440 | 475 | 510 | 48 |
| 5 Wt % Bisphenol S | 1 day, 230° 50.5 hrs, 260° | 400 | 450 | 475 | 510 | 565 | 38 |

TABLE 2
FRACTURE TOUGHNESS AND BENDING MODULI OF MODIFIED BISPHENOL A PHTHALONITRILES

| Sample | Fracture Toughness $G_{Ic}$ (J/m²) | Bending Modulus E (GN/m²) |
|---|---|---|
| Bis-A Phth + 5% Bisphenol S | 85 | 3.8 |
| Bis-A Phth | 99 | 3.9 |
| Narmco 5208 Resin | 76 | 3.9 |

The phthalonitrile resins of this invention have a significantly lower cure time and temperature than comparable resins polymerized neat which require several days of continuous heating at 260°–290° C. before a viscosity increase becomes evident. These resins are more thermally stable than the comparable neat-polymerized resins, which are very thermally stable. Thus, they provide a new matrix material with long-term operational capability in excess of 250° C. and with the ability to retain reinforcing fibers during or following exposure to a fire environment. These resins like their neat counterparts are insensitive to high humidity and are highly unreactive at ambient temperatures. On account of the greatly improved processability, and the relative low cost of the other reagents, the cost of the resin is largely dependent on the cost of 4-nitrophthalonitrile, which is not extremely expensive.

Throughout the specification and the claims to follow, all weight percents are based on the total resin weight. Obviously many modifications and variations of the present invention are possible in light of the above teaching. It is therefore to be understood that within the scope of the appended claims the invention may be practiced otherwise than as specifically described herein.

What is claimed is:

1. A phthalonitrile resin obtained by admixing a phenol in an amount from about 1 weight percent to about 40 weight percent with a diphthalonitrile monomer at a temperature from about the melting point of said monomer to about the decomposition temperature of said resin.

2. The resin of claim 1 wherein said monomer is ether-linked.

3. The resin of claim 1 wherein the ether linkage of said monomer is represented by the formula: O—R—O wherein R is selected from the group consisting of —φ—C₃H₆—φ—, —φ—SO₂—φ—, —φ—φ—, —φ—, and —C_nH_{2n} — wherein said phenyl groups are attached at the para and meta positions and n designate chain length.

4. The resin of claim 3 wherein said phenol has a boiling point and decomposition temperature of at least about 50° C. in excess of the temperature at which the mixture is heated.

5. The resin of claim 4 wherein said phenol has a boiling point and decomposition temperature of at least about 75° C. in excess of the temperature at which said monomer is polymerized.

6. The resin of claim 4 wherein said phenol is selected from the class consisting of dihydroxydiphenol sulfone, and bisphenol A polysulfone represented by the formula:

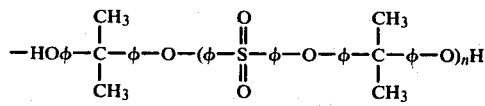

wherein n is an integer from 1 and 5, said phenols having both para and meta attachments of phenyl groups thereof.

7. The resin of claim 6 wherein said phenol is selected from the class consisting of dihydroxydiphenol sulfone and a dihydroxydiphenol isopropane-polysulfone represented by the formula

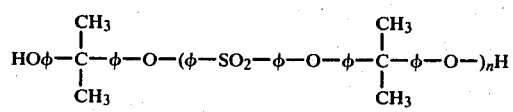

wherein n is from 1 to 3, said phenols having both para and meta attachments of phenyl groups thereof.

8. The resin of claim 6 wherein the amount of said phenol is from about 1 weight percent to about the stoichiometric amount.

9. The resin of claim 7 wherein the amount of said phenol is from 1 to 20 weight percent.

10. The resin of claim 9 wherein the amount of said phenol is from 7 to 15 weight percent.

11. A resin obtained by admixing a phenol in an amount from about 1 weight percent to about 40 weight percent, a diphthalonitrile monomer, and an inorganic ingredient selected from the group consisting of cuprous chloride, cuprous bromide, cuprous cyanide, cuprous ferricyanide, zinc chloride, zinc bromide, zinc iodide, zinc cyanide, zinc ferrocyanide, zinc acetate, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride (2TPPO/SnCl₂), chromium, molybdenum, vanadium, beryllium, silver, mercury, aluminum, tin, lead, antimony, calcium, barium, manganese, magnesium, zinc, copper, iron, cobalt, nickel, palladium, platinum, and mixtures thereof, at a temperature from about the melting point of said monomer to about the decomposition temperature of said resin.

12. A phthalonitrile resin obtained by forming a solution of diphthalonitrile monomer; admixing said solution with an effective amount of a phenol having boiling point and a decomposition temperature of at least about 50° C. in excess of the boiling point of said solution to form a suspension; heating said suspension until the B-stage of said resin is reached; quenching said B-staged resin; removing said solvent by reduced pressure to form a frangible solid; and heating said solid, until the C-stage of said resin is reached at a temperature from at least about the melting point of said solid to about the decomposition temperature of said phthalonitrile resin.

13. The diphthalonitrile monomer of claim 12 wherein said phthalonitrile has an ether-linked bridge.

14. The resin of claim 13 wherein said phenol has a boiling point and a decomposition temperature of at least 75° C. in excess of the boiling point of said solvent.

15. The resin of claim 13 wherein said phenol is selected from the group consisting of dihydroxydiphenol sulfone, dihydroxydiphenol isopropane, and

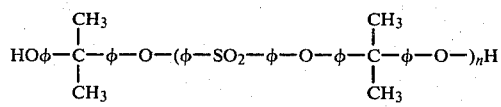

wherein n is an integer from 1 to 5, said phenols having both para and meta attachments of phenyl groups thereof.

16. The resin of claim 15 wherein said phenol is added in an amount from about 1 weight percent to the stoichiometric amount.

17. The resin of claim 15 wherein said phenol is added in an amount from 1 to 20 weight percent.

18. In a method of polymerizing a di-ether linked diphthalonitrile monomer comprising heating said monomer to a temperature greater than the melting point of said monomer until polymerizing is completed, the improvement which comprises admixing said monomer with a phenol having a boiling point and a decomposition temperature of at least about 50° C. in excess of the melting point of said monomer.

19. The method of claim 14 wherein said phenol has a boiling point and decomposition temperature of at least about 75° C. greater than the melting point of said monomer.

20. The method of claim 18 wherein said phenol is selected from the group consisting of dihydroxydiphenol sulfone, dihydroxydiphenol isopropane, a bisphenol-A polysulfone represented by the formula:

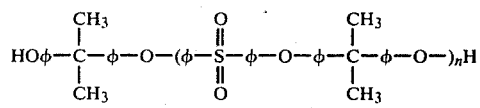

wherein n is an integer from 1 to 5, said phenols having both para and meta attachments of phenyl groups thereof.

21. In a method of polymerizing a di-ether linked diphthalinitrile monomer which comprises dissolving said monomer in a solvent to form a solution; heating said solution until the B-stage of said resin is reached; quenching B-staged resin; removing said solvent by reduced pressure to form a frangible solid; and heating said solid, until the C-stage of said resin is reached, at a temperature from at least about the melting point of said solid to about the decomposition temperature of said resin, the improvement which comprises admixing an effective amount of a phenol having a boiling point and a decomposition temperature of at least about 50° C. in excess of said solvent with said solution prior to heating.

22. The method of claim 21 wherein the boiling point and decomposition temperature of said phenol are at least 75° C. in excess of the boiling point of said solvent.

23. The method of claim 21 wherein said phenol is selected from the class consisting of dihydroxyphenol sulfone, dihydroxydiphenol isopropane, a bisphenol-A polysulfone represented by the formula:

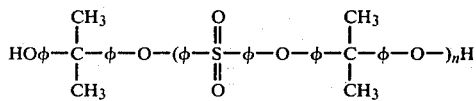

wherein n is an integer from 1 to 5, said phenols having both para and meta attachments of phenyl groups thereof.

* * * * *